June 19, 1951      J. P. FRANCESCO      2,557,088
KEEL LINE INDICATING DEVICE
Filed Nov. 14, 1945
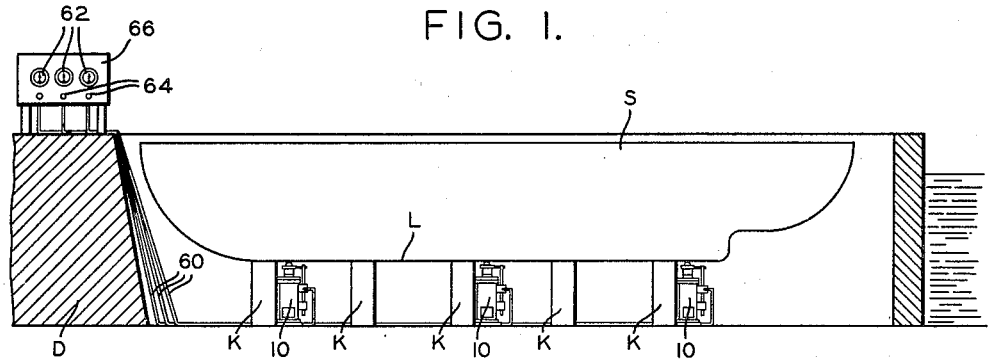
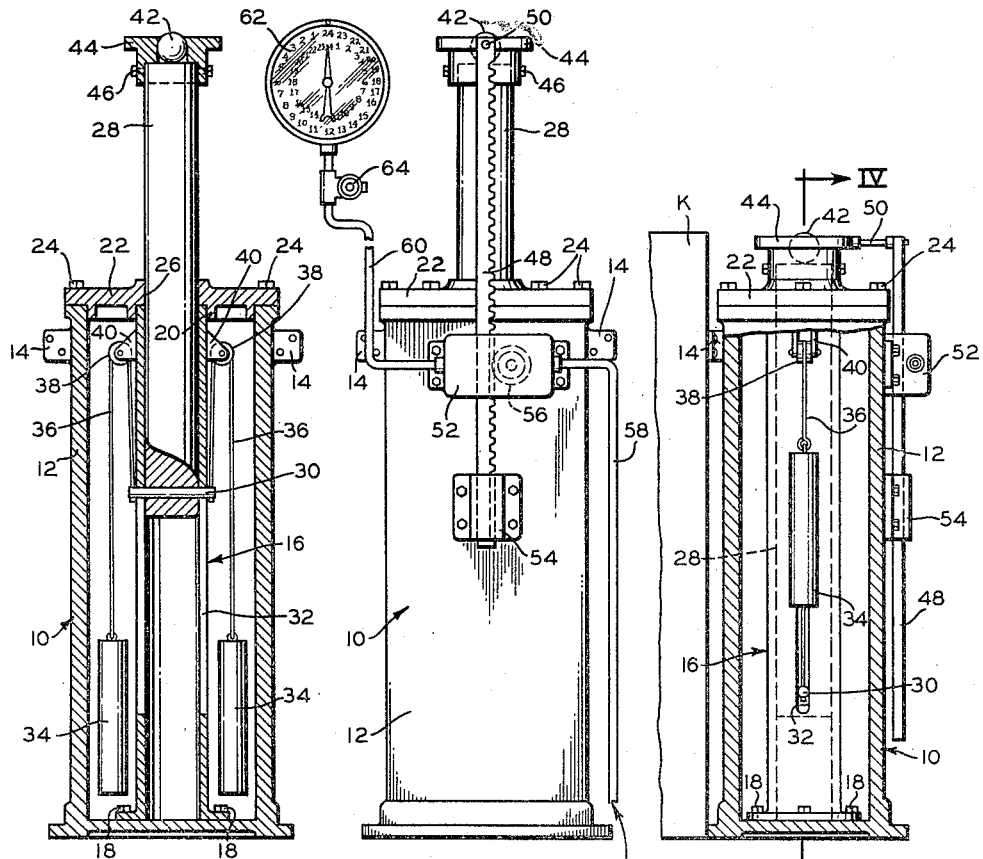
INVENTOR
JOHN P. FRANCESCO
BY *Ralph W. Chappell*
ATTORNEY Patented June 19, 1951

2,557,088

UNITED STATES PATENT OFFICE 2,557,088

KEEL LINE INDICATING DEVICE

John P. Francesco, Haverhill, Mass.

Application November 14, 1945, Serial No. 628,618

5 Claims. (Cl. 33—172)

(Granted under the act of March 3, 1883, as amended April 30, 1928; 370 O. G. 757)

This invention relates to indicating devices and more particularly to a device for indicating the keel line of a ship when the ship is being dry docked or being removed from dry dock.

It is desirable during dry docking operations, as a ship is settling upon the keel blocks of the dry dock, to know precisely, the amount of any sag or irregularities in the ship's keel line. It is also desirable, for record purposes, to have information relative to the amount of sag that may take place in a ship's keel line when the ship is undocked, i. e., when water is admitted into the dry dock and the ship floated off of the keel blocks.

It is an object of the present invention therefore, to provide a device for indicating upon a dial a direct measurement reading of the amount of sag or irregularity either, existing in the keel line of a ship when the keel is resting upon the keel blocks, or taking place in the keel line incident to undocking operations.

Another object of the invention is to provide a device of this character which is simple in construction and operation, composed of few parts, reliably operative, unaffected by immersion, and inexpensive in manufacturing and maintenance costs.

With the above and other objects and features in view, the invention will now be described with reference to the accompanying drawings which illustrate a preferred embodiment of the invention and will be pointed out in the claims.

Fig. 1 is a schematic view of a ship in dry dock illustrating the manner in which the device is set up for operation.

Fig. 2 is a front elevation of one of the keel line feeler units.

Fig. 3 is a side elevation thereof partly in section, and,

Fig. 4 is a sectional elevation taken along the line IV—IV of Fig. 3.

Referring to Fig. 1, there is shown schematically a dry dock D having a ship S resting upon keel blocks K within the dock. The keel line of the ship is designated L. It is desirable in docking operations to know of any sag or irregularities existing in the line L as the ship S settles upon the blocks K when the water is drawn out of the dock. It is also desirable during undocking operations to know of any sag taking place in the line L incident to the ship S being floated off of the blocks. This invention provides a device which permits the taking of direct readings of the distances between the upper surfaces of the blocks K and the line L at different points therealong and during course of the docking or undocking operations.

In this manner, the amount of sag or irregularities in the line L may be readily determined by comparing readings taken from each of a series of gages, the dials of which are calibrated to register, in inches, the descent and rise of the line L with respect to the upper surfaces of the blocks K during docking and undocking operations.

The device includes a series of identical units 10 such as are shown in detail in Figs. 2, 3 and 4. Each unit 10 comprises an upstanding casing or housing 12 having lugs 14 for securing the units, as by screws, into position adjacent to one side of the blocks K. An upright tube or cylinder 16 is secured centrally of the housing 12, the bottom of the cylinder being secured to the base of the housing by screws 18, and the top of the cylinder being securely socketed within a depending circular flange 20 formed integral with a cover 22. The cover 22 is secured by screws 24 to the top of the housing and has an opening 26 centrally thereof in alignment with the bore of the cylinder 16.

A rod or feeler 28 is mounted for sliding movement within the opening 26 and the bore of the cylinder. The lower end of the feeler has secured therein a transversely disposed pin 30, the opposite ends of which extend through oppositely disposed slots 32 in the cylinder. The upper and lower ends of the slots 32, co-acting with the pin 30, define the limits of upward and downward sliding movement of the feeler 28. Normally, the feeler 28 is held yieldingly in its uppermost position, as shown in Figs. 2 and 4, by a pair of oppositely disposed weights 34. Each weight 34 is fastened to one end of a cable 36. Each cable 36 passes over a pulley 38 rotatably mounted in an outwardly projecting bracket 40 formed on the cylinder 16 and is connected to the pin 30. A ball 42 is mounted atop the feeler 28 in a cap 44 fastened by screws 46 to the upper end of the feeler. The ball 42 provides a spherical surface for tangentially contacting the keel of the ship.

A vertically disposed rack 48 is connected at its upper end to an outwardly extending projection 50 secured on the cap 44. The rack 48 extends downwardly through suitable openings provided in regulating box 52 and through a guide bracket 54, both of which are secured to one side of the housing 12. The rack teeth mesh with a pinion 56 rotatably journaled in the regulator box 52. The pinion is operable by the movement of the rack to regulate the flow of fluid pressure through a standard pressure reducing valve supported in box 52 whether the pinion be rotated in a clockwise or counterclockwise direction. An input line 58 is connected at one end to one end of the regulator box 52 and communicates with the input port of the pressure reducing valve, and at its opposite end, to a source of fluid under pressure. The opposite end of the box 52 has an outlet line 60 connected thereto and coupling the output port of the pressure reducing valve to conventional fluid pressure gage 62. A hand operated release valve 64 is interposed in each line 60 between each gage 62 and its regulator box 52.

The gages 62 of the units are each mounted on a panel 66 (Fig. 1), secured to the upper platform of the dry dock D. The dials of the gages are calibrated in inches in correspondence with pounds of pressure admitted to the gage by the pressure regulator in box 52 as related to the amount of raising or lowering movement imparted to the feeler 28 and rack 48 by the keel of a ship. For illustrative purposes, assume that when the feelers and racks occupy their uppermost positions as shown in Figs. 2 and 4, the indicators of the dials of the gages 62 register "24" indicating that the extreme upper ends of the feelers are 24 inches from the upper surfaces of the keel blocks K. The distance of movement of the feelers 28 downwardly from their uppermost positions to their lowermost positions, wherein their upper surfaces are exactly even with the upper surfaces of the keel blocks K, is just sufficient to rotate their pinions 56 an amount that will admit an extent of fluid to the gages 62 to cause their indicators to be moved completely around the dials to "0."

In operation, the device is set up as illustrated in Fig. 1 with a plurality of units 10 secured to the spaced keel blocks K, each unit communicating with its respective gage 62. While only three units 10 are shown in this figure, it is to be understood that any number of such units and gages 62 may be employed in the set-up, this number being determined by the length of the ship S and the degree of accuracy in the overall keel line readings which it is desired to obtain.

During the docking operation, as the ship's keel gradually descends, it contacts the balls 42 of the feelers 28, whereby the latter are moved gradually from their uppermost positions, downwardly toward the upper ends of the keel blocks K. At any stage in the operation when all of the feelers 28 are contacting the keel line L, any sag or irregularity in the line L may be determined by simply reading each gage 62 and making comparison between the various readings registered. For example, if at a certain stage in the operations wherein all of the feelers 28 are contacting the keel line L, the forward and aft gages registered 12 inches and the midship gage registered 16 inches; this would indicate a sag of 4 inches in the keel line.

To restore the indicators of the gages 62 to their initial or starting position, it is only necessary to open the manual release valves 64 and thereby release the pressure on the gages 62.

In undocking operations, since, as before noted, the regulator boxes 52 are operable to admit fluid to the gages 62 on the upstroke of the feelers 28, as well as on the downstroke, the procedure is the same as that described in the foregoing in connection with docking operations. It is apparent, therefore, that at any time after the keel line L has been completely floated off of all of the keel block K and before the feelers have risen to their fullest extents of upward movement, comparative readings may be taken to determine the amount of sag, if any, in the keel line L. To facilitate the taking of readings in this reverse process, a second set of measurement calibrations, in reverse order, are provided on each of the dials of the gages 62 just within and adjacent to the outer set of calibrations.

The invention described herein may be manufactured and used by or for the Government of the United States of America for government purposes without the payment of any royalty thereon or therefor.

Having described the invention what is claimed as novel and desired to be protected by Letters Patent of the United States is:

1. In apparatus for indicating irregularities in the keel line of a ship during docking and undocking thereof upon keel blocks, a device for measuring the distance of the keel line from the top of a keel block, said device comprising, an elongated cylindrical casing, means for securing said casing to said keel block in a vertical position, a cylinder secured centrally within said casing, said cylinder having diametrically opposite elongated slots formed therein along a portion of the length thereof, a feeler rod mounted for vertical movement in said cylinder, a pin extending through the lower end of said rod and projecting through said elongated slots for limiting the range of travel of said rod to the length of said slots, means secured to said rod for normally urging said rod to the uppermost limit of the range of travel thereof, a pressure reducing valve secured to the outer surface of said casing, means supplying a constant fluid pressure to the inlet of said valve, a fluid pressure gage calibrated in units of distance of the upper extremity of said feeler rod from the top of said keel block, means connecting the outlet of said valve to said gage, means secured to said feeler rod and operable thereby and coactive with said valve for regulating the flow of pressure through said valve in accordance with the position of said feeler rod, whereby said pressure gage indicates the amount of ascent or descent of the upper extremity of said feeler rod within the aforementioned range of travel thereof.

2. In apparatus for indicating irregularities in the keel line of a ship during docking and undocking thereof upon keel blocks, apparatus for measuring the distance of the keel line from the top of a keel block, said apparatus comprising a submersible elongated casing, a cylinder secured centrally within said casing, said cylinder having diametrically opposite slots formed therein along a portion of the length thereof, a feeler rod slidably mounted in said cylinder, a pin extending through the lower end of said rod and projecting through said slots for limiting the range of travel of said rod to the length of said slots, a pair of weights respectively secured to the ends of said pin for normally urging said rod to the upper limit of the range of travel thereof, means for securing said casing to said keel blocks in a position where the upper extremity of said feeler rod is at the same level as the top of said keel block when said feeler rod is at the lower limit of its range of travel, a submersible pressure reducing valve secured to the outer surface of said casing, means applying a substantially constant fluid pressure to the inlet of said valve, a fluid pressure gage calibrated in units of distance of the upper extremity of said feeler rod above the top of said keel block, means connecting the output of said valve to said gage, a rack secured to said feeler rod and coactive with said valve for regulating the flow of pressure therethrough in accordance with the position of said feeler rod, whereby said pressure gage continuously indicates the distance of the upper extremity of said feeler rod from the top of said keel block within the aforementioned range of travel thereof.

3. Apparatus for measuring the vertical distance from the top of a keel block to the keel line of a ship being docked on or undocked from the keel block comprising, a submersible cylindrical casing, a cylinder secured centrally within said casing, a cover for said casing having an opening therein equal in diameter to said cylinder, said cylinder having diametrically opposite slots formed therein along a portion of the length thereof, a vertically movable feeler rod slidably mounted within said cylinder and projecting normally with its upper end a fixed distance above said cover, a pin extending through the lower end of said rod and projecting through said slots for limiting the range of travel of said rod to the length of said slots, a pair of weights connected to said pins and operable to return said rod to its normal position when the ship is disengaged from said rod, means for securing said casing to said keel block in a position where the upper end of said rod is at the level of the top of the keel block when said feeler rod is at the lower limit of its range of travel, a submersible pressure reducing valve secured to the exterior of said casing, means applying a substantially constant fluid pressure to the inlet of said valve, a fluid pressure gage calibrated in units of distance of travel of said feeler rod, means connecting the output of said valve to said gage, a rack secured to said feeler rod and coactive with said valve for regulating the opening thereof in accordance with the position of said feeler rod, whereby said gage continuously indicates the distance of the upper end of said rod from the top of the keel block within the aforesaid range of travel.

4. Submersible apparatus for measuring vertical distances from a reference line comprising, an elongated submersible cylindrical casing, a cylinder secured centrally within said casing, said cylinder having diametrically opposite slots formed therein along a portion of the length thereof, a vertically movable feeler rod slidably mounted within said cylinder, a pin extending through the lower end of said rod and projecting through said slots for limiting the range of travel of the upper end of said rod from said reference line to a distance above said reference line equal to the length of said slots, a pair of weights connected to said pin and arranged to normally urge said rod to the upper limit of its range of travel, a submersible pressure reducing valve secured to the exterior of said casing, means supplying a substantially constant fluid pressure to the inlet of said valve, a fluid pressure gage calibrated in units of distance of travel of said feeler rod throughout said range of travel, means connecting the output of said valve to said gage, a rack secured to said feeler rod and coactive with a pinion secured to said valve for regulating the opening of said valve in response to vertical movement of said rod, whereby said gage continuously indicates the distance of the upper end of said rod from said reference line within the aforesaid range of travel.

5. Apparatus for measuring irregularities in the keel line of a ship while in a floating condition comprising, in combination, a plurality of keel blocks distributed along the length of said keel upon which said ship is adapted to be docked, the upper surfaces of said keel blocks defining a reference line from which vertical distances to the keel line of the ship during docking and undocking may be measured, a like plurality of devices for measuring vertical distances from said reference line to the keel line of said ship each of which includes a submersible cylindrical outer casing, an inner cylinder secured centrally within said casing, said inner cylinder having a pair of diametrically opposite slots formed therein along a portion of the length thereof, a vertically movable feeler rod slidably mounted within said cylinder and projecting normally with its upper end a predetermined distance above said casing, a pin extending through the lower end of said rod and projecting through said slots for limiting the range of travel of said rod to the length of said slot, means secured to said rod operable to return it to its normal position when the upper end thereof is disengaged from said ship, means securing each casing to its respective keel block in a position where the upper end of said rod at the lower limit of its range of travel coincides with said reference line, a submersible pressure reducing valve secured to the exterior of said casing, a source of substantially constant fluid pressure communicating with the inlet of each of said valves, a like plurality of proximately located fluid pressure gages each connected to the output of a corresponding pressure reducing valve, each of said gages being calibrated in units of distance of travel of the upper end of said feeler rod above said reference line, means secured to said feeler rod and coactive with said valve for regulating the opening thereof in accordance with the position of said feeler rod, whereby said plurality of gages continuously indicate the distance of the keel line of the ship from said reference line.

JOHN P. FRANCESCO.

REFERENCES CITED

The following references are of record in the file of this patent:

UNITED STATES PATENTS

| Number | Name | Date |
|---|---|---|
| 1,954,442 | Dall et al. | Apr. 10, 1934 |
| 2,160,027 | Matthias | May 30, 1939 |
| 2,295,957 | Laurencelle | Sept. 15, 1942 |
| 2,386,181 | Bailey | Oct. 9, 1945 |

FOREIGN PATENTS

| Number | Country | Date |
|---|---|---|
| 882,928 | France | Mar. 15, 1943 |